United States Patent
Haig

(10) Patent No.: US 6,582,741 B2
(45) Date of Patent: Jun. 24, 2003

(54) DEVICE FOR STUFFING MEAT PRODUCTS AND RELATED METHOD

(76) Inventor: David E. Haig, 304 Atwood Rd., Glenside, PA (US) 19037

( * ) Notice: Subject to any disclaimer, the term of this patent is extended or adjusted under 35 U.S.C. 154(b) by 62 days.

(21) Appl. No.: 09/858,352

(22) Filed: May 15, 2001

(65) Prior Publication Data

US 2001/0039885 A1 Nov. 15, 2001

Related U.S. Application Data

(60) Provisional application No. 60/204,302, filed on May 15, 2000.

(51) Int. Cl.$^7$ ................................................ A21C 9/06
(52) U.S. Cl. ..................... 426/281; 426/283; 426/284; 426/514; 426/518; 99/450.8; 99/494; 99/533; 83/868; 83/932
(58) Field of Search ................ 99/450.6–450.8, 99/494, 345, 533, 557, 558; 426/281–284, 512, 514, 518; 83/861, 866, 868, 932

(56) References Cited

U.S. PATENT DOCUMENTS

| | | | |
|---|---|---|---|
| 341,357 A | | 5/1886 | Sterling |
| 609,799 A | * | 8/1898 | Flinn |
| 1,384,161 A | * | 7/1921 | Schwinzer |
| 1,409,463 A | | 3/1922 | O'Brien |
| 1,485,253 A | * | 2/1924 | Devlin |
| 1,807,189 A | * | 5/1931 | Bemis |
| 1,871,837 A | * | 8/1932 | Brown |
| 1,873,920 A | | 8/1932 | Bemis |
| 1,917,137 A | | 7/1933 | Marchio |
| 1,940,564 A | | 12/1933 | Schilling ..................... 107/1 |
| 2,118,976 A | | 5/1938 | Larkin ......................... 107/1 |
| 2,359,881 A | * | 10/1944 | Serr ........................... 146/106 |
| 2,784,682 A | | 3/1957 | Clevenger ................... 107/1 |
| 3,241,477 A | | 3/1966 | Jenner ......................... 99/345 |
| 4,178,660 A | | 12/1979 | Olney .......................... 99/532 |
| 4,640,187 A | * | 2/1987 | Wallick et al. ............... 99/538 |
| 4,703,688 A | | 11/1987 | Ochs ........................ 99/450.8 |
| 5,123,905 A | | 6/1992 | Kelman ...................... 606/107 |

FOREIGN PATENT DOCUMENTS

| EP | 0 157 897 | 4/1984 |
|---|---|---|
| FR | 2 409 737 | 11/1977 |

* cited by examiner

*Primary Examiner*—Keith Hendricks
*Assistant Examiner*—Drew Becker
(74) *Attorney, Agent, or Firm*—Richard P. Gilly; Wolf, Block, Schorr and Solis-Cohen LLP

(57) ABSTRACT

A device is particularly well suited for introducing a continuous length of food stuffing into an elongated food product. The device uses a tube having opposite, open ends and an inner wall defining a longitudinal passage extending between such opposite ends. The length of foodstuffing is received in this longitudinal passage. The tube is inserted into the food product being stuffed, and a pointed cap on the end of the tube guides it through the food product. A ram is used in conjunction with the tube to keep the foodstuffing material in substantial registration with the ends of the food product and to assist in withdrawing the tube after the foodstuffing has been deposited in the food product. An optional parallel knife assembly is used to create an incision extending through the food product to ease the subsequent insertion of the foodstuffing therein.

9 Claims, 2 Drawing Sheets

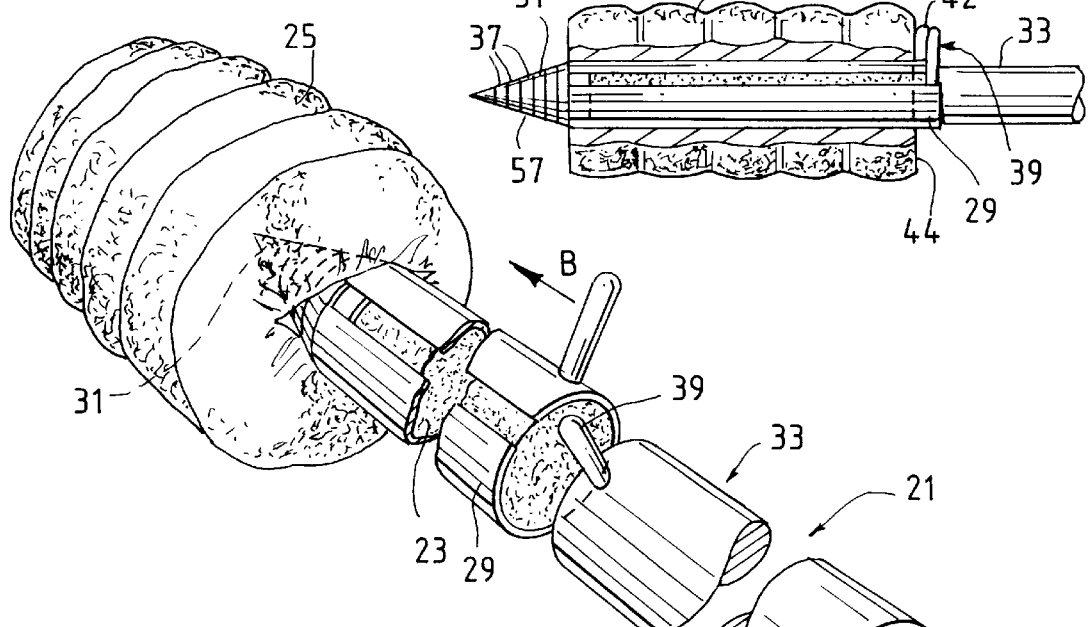
FIG. 6
FIG. 7
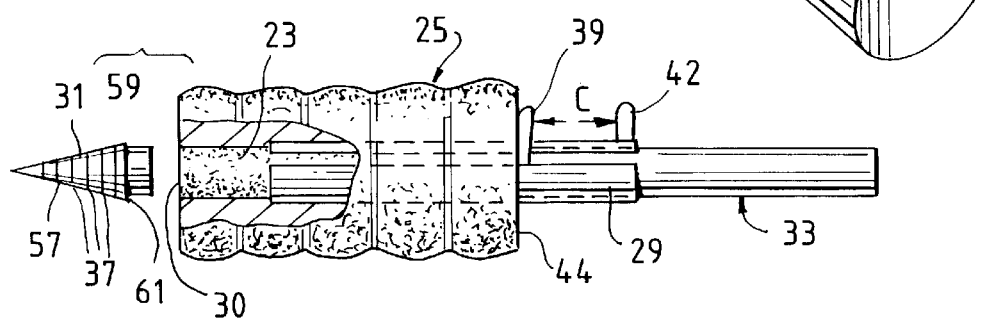
FIG. 8
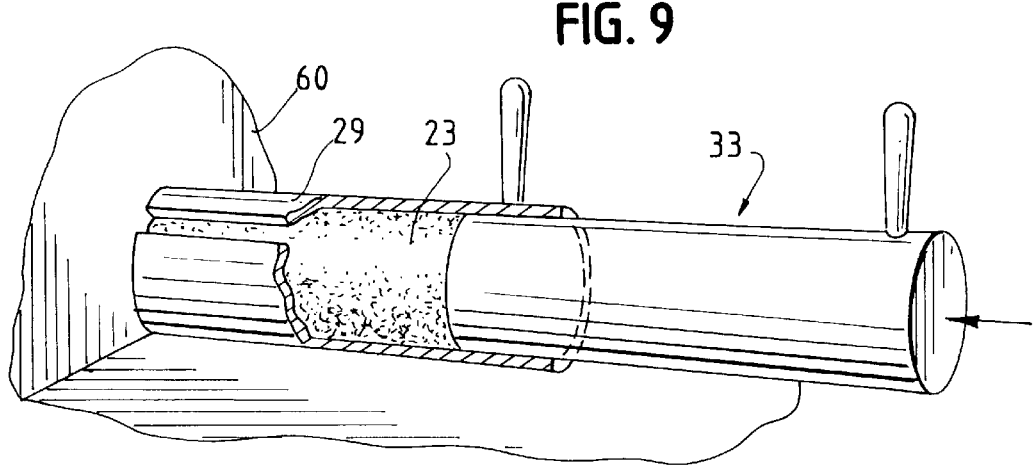
FIG. 9

DEVICE FOR STUFFING MEAT PRODUCTS AND RELATED METHOD

This application claims the benefit of U.S. Provisional Application No. 60/204,302, filed on May 15, 2000.

BACKGROUND OF THE INVENTION

Prior art methods and associated devices for stuffing food products, particularly the stuffing of meat products, have suffered from various drawbacks and disadvantages. One such method, the butterfly method, is neither aesthetically pleasing nor uniform, as the stuffing material tends to spill out or not be accurately placed within the slit. The inconsistency and nonuniformity of the stuffed product is only exacerbated when the food product stuffed according to these methods is cooked or otherwise handled.

The rolling method, which involves rolling the stuffing material into the food product 25, suffers from similar disadvantages.

Another stuffing method, the coring method, requires the additional step of drilling out portions of the product. This creates a large amount of waste and a volumetric reduction in the surrounding food products.

Devices described in prior art patents, such as Ochs U.S. Pat. No. 4,703,688, are ill-suited for stuffing many food products, especially meats, and do not allow for aesthetic presentation of the stuffing with the food product.

In view of the foregoing, it is desirable to add value and weight by stuffing a product without the waste and associated expense of the coring method, and without the unsightly and inconsistent results of the butterfly and rolling methods.

SUMMARY OF THE INVENTION

In a preferred embodiment of the invention, a device introduces a continuous length of food stuffing into an elongated food product by making use of a tube with a slot formed therein, a cap removably attached to the tube, and a ram which is sized to be slidably received in the passage of the tube.

In a related method, the food product is stuffed with a continuous length of foodstuffing by inserting the continuous length of foodstuffing inside the slotted tube, the tube having the pointed cap at one of its ends. Then, the food product is penetrated at a selected point on the exterior of the food product using the pointed cap on the tube. The tube is then advanced relative to the food product until the cap exits the food product at a location substantially opposite the selected point of penetration. The operator then removes the cap from the end of the tube and inserts the ram into one of the ends of tube. The ram has a stop at that end of the ram which is first received in the slot of the tube, and is thus put against the food product In this way, the stop abuts against the food product at the penetration location and keeps both the food product and the foodstuffing in position while the tube is being withdrawn the food product.

BRIEF DESCRIPTION OF THE DRAWING

The invention will be more readily understood by reference to the drawing, which comprises the following figures:

FIG. 6 is a perspective view showing one of the operating methods of the present invention;

FIG. 7 is a cut-away side elevational view of the invention at another point during its use;

FIG. 8 is another, side elevational, cut-away view of the invention at another point during its operation; and FIG. 9 is a perspective view of another operation according to the present invention.

DETAILED DESCRIPTION OF THE PREFERRED EMBODIMENT

Figure 1:
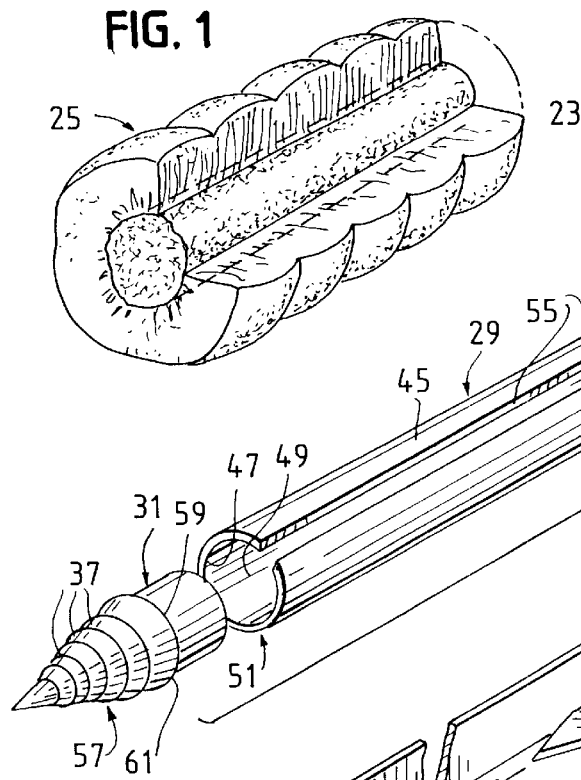
FIG. 1 is a partly sectional, perspective view of a food product susceptible to the methods and device of the current invention.
Figure 2:
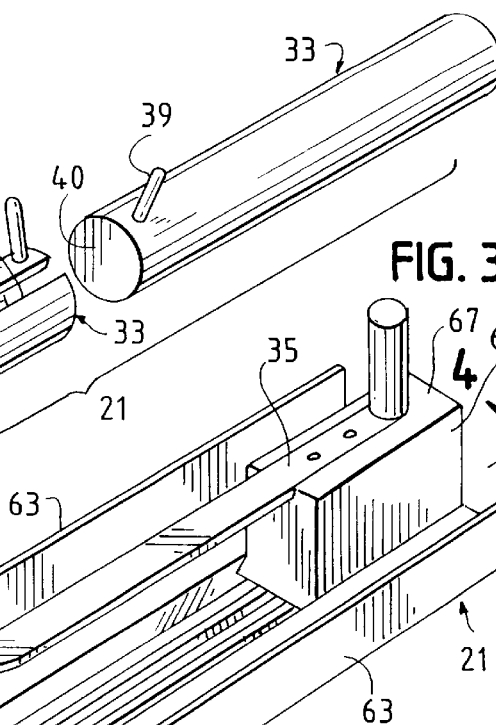
FIG. 2 is an exploded, perspective view of one of the components of the present invention.
Figure 3:
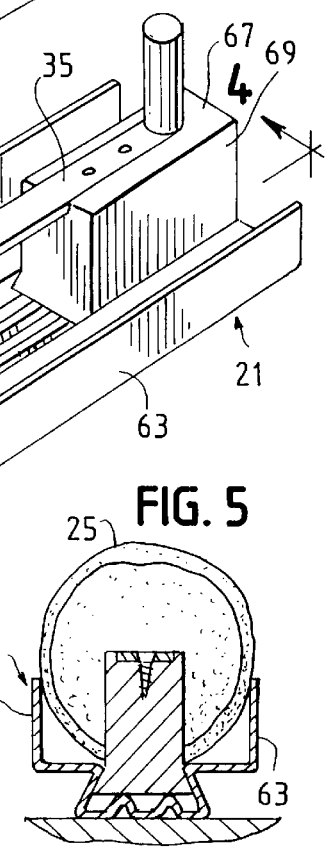
FIG. 3 is a perspective view of another of the components of the present invention.

Referring now to the drawings, FIGS. 1–8, a device 21 (FIGS. 2 and 3) in one preferred embodiment, introduces foodstuffing material 23 (FIG. 1), such as bread stuffing, rice stuffing, vegetables, etc., into another, generally elongated food product 25, such as a pork loin, another meat product, or even non-meat applications, such as a loaf of bread. The device 21 comprises three main components: (1) a parallel knife assembly 27 for creating an insertion path through food product 25 for the stuffing, especially if food product 25 comprises particularly dense meat or other tough receiving material; (2) a slotted tube 29 with a removable cone 31; and (3) a ram 33 which can be slidably inserted into and through the tube 29.

Figure 5:
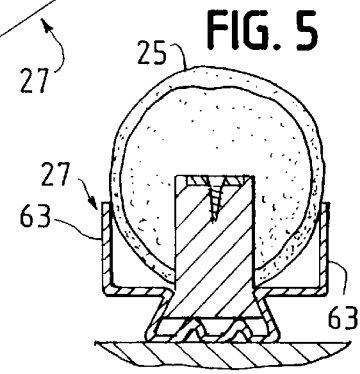
FIGS. 4 and 5 are sectional views taken along lines 4—4 and 5—5, respectively, of the component shown in FIG. 3.
Figure 4:
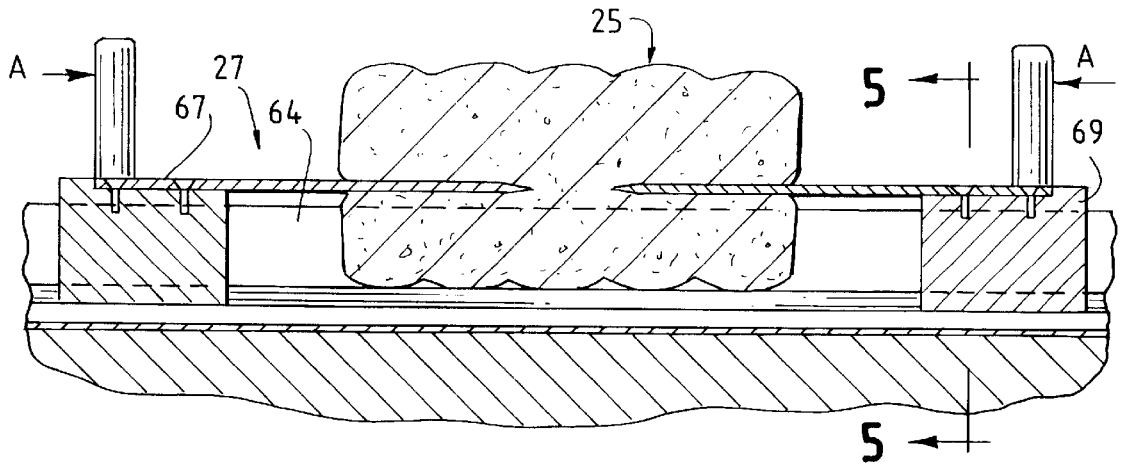

The features of the invention are further appreciated by discussing how it is used to "stuff" food product 25, such as a pork loin, loaf of bread, or other elongated foodstuff. The food product is optionally placed in parallel knife assembly 27, as shown in FIGS. 4 and 5. Blades 35 are advanced in the inward directions of arrows A until their tips overlap (not shown), thus creating a single, continuous, longitudinal incision through food product 25.

The assembled cone and tube combination 31/29 is inserted into food product 25 in the direction of arrow B. If the parallel knife assembly 27 was used, the cone 31 penetrates food product 25 through the slit or incision previously formed therein,. Cone 31 eases insertion of the tube 29 and allows it to penetrate food product 25 more readily. Prior to insertion of the tube 29, an elongated mass or "log" of foodstuffing 23, such as vegetables, rice, breaded material, and the like, is loaded into tube 29.

The combination tube and cone are inserted all the way through the food product until cone 31 exits from one of the ends of food product 25, as shown in FIG. 7, and until forward edge 30 (FIGS. 1 and 8) of the log of foodstuffing is in alignment with the corresponding end of food product 25. The cone is then removed from tube 29, and such removal is assisted by ribs 37 formed in cone 29 so that the operator has an improved grip on cone 31.

At this point, then, tube 29 of device 21 extends longitudinally through the food product 25, and, in turn, the log of foodstuffing is within tube 29 within the food product 25. In this preferred embodiment, the next step is to remove tube 29 from the food product 25 by making use of ram 33 as follows: ram 33 has a stop 39 at its end 40 (FIG. 1), and it is this end 40 which is inserted into trailing end 53 of tube 29 until stop 39 of ram 33 comes in contact with food product end 44 of the food product 25, as best seen in FIGS. 7 and 8. Stop 39 of the ram 33 has a width which allows it to be slidably received in slot 41 of tube 29. In this position, stop 39 is in contact with the food product 25, and the corresponding end 40 of ram 33 is in contact with the log of food stuffing.

Referring now to FIG. 8, force is applied in one of both of the stop 39 or handle 43 on tube 29, in the direction indicated by arrows C, to withdraw tube 29 from food product 25. During this operation, while tube 29 is being withdrawn, ram 33 simultaneously holds back both the food product 25 and the foodstuffing 23 inserted therein. Tube 29 is withdrawn from the food product 25 and stop 39 slides longitudinally relative to slot 41 of tube 29 as tube 29 is withdrawn, until tube 29 is fully removed from the food product 25.

By inserting ram 33 and its corresponding stop 39 through tube 29 as described above, a stuffing log of suitable length is aligned with one or both of the ends of the food product 25 after the tube has been withdrawn.

Another aspect of the invention is to use tube 29 and ram 33 to form log of foodstuffing 23 itself. In particular, as shown in FIG. 9, log of foodstuffing 23 is created by first loading the stuffing material into the tube 29, after it has been blocked at one of its ends by surface 60, and then by compacting the stuffing material, using ram 33, thus creating a log of uniform stuffing density. The log of stuffing can then be removed with the ram and stored for future use, or can be inserted into the food product 25, along with the tube. It is oftentimes preferable to freeze the resulting log of foodstuffing 23 before inserting it into food product 25. Such a frozen log offers many benefits as freezing locks in freshness, allowing it to be inventoried for longer periods. Additionally, freezing offers a greater mechanical stability to the foodstuffing 25 during stuffing operations, resists changes to the intended geometry of the log during handling, and improves the overall quality of the product.

Slotted tube 29 is preferably formed from a metallic material, more preferably stainless steel. Tube 29 has a length selected to correspond to the food product to be stuffed. Similar considerations apply to the cross-sectional area of tube 29, as well as its shape. Thus, in the preferred embodiment, tube 29 has a length and a cross-sectional area selected to be used in a pork loin. Obviously, it is within the skill of the art to vary the shape of the cross-section of tube 29 to appear as a triangle, square, rectangle, or other aesthetic shape which skill or fancy may suggest. Tube 29 has exterior, cylindrical wall 45 and inner wall 47, with inner wall 47 defining a longitudinal passage 49 extending between leading end 51 and trailing end 53 of tube 29.

Slot 41 is defined between exterior and inner wall 45, 47 and generally comprises opposing edges 55 which are substantially parallel to each other. Slot 41 and stop 39 are sized to permit stop 39 to slide freely along the length of slot 41 as ram 33 and slotted tube 29 are moved relative to each other during the stuffing operations described previously.

Removable cone 31 is preferably formed of polymeric material sufficiently hard to penetrate the food product being stuffed. It is important to be able to remove cone 31 from its position at the leading end 51 of slotted tube 29, especially after it has passed through the food product 25 to be stuffed, as shown in FIG. 7. Since the projecting surface 57 of cone 31 may become coated with slippery food product material, cone 31 is preferable equipped with suitable ribs 37.

In addition, the means for attaching the cone 31 to tube 29 must be selected so that the passage of the cone 31 through the resisting material of food product 25 does not force cone 31 hard against tube 29 and then make cone 31 difficult to pull off. Accordingly, cone 31 is formed with an annular flange 51 at its base which has a reduced diameter, that is, a diameter smaller then the base of cone 31. The reduced diameter flange extends from the cap and is selected to engage the inner wall 47 of leading end 51 of tube 29 in a friction fit. This construction creates a radially oriented shoulder portion 61 on the base of cone 31, which shoulder portion 61 abuts leading end 51 of tube 29. Such construction, in turn, resists having cone 31 forced excessively hard onto tube 29 as it is being pushed forward through food product 35, thereby increasing the assurance that cone 31 is readily removable after it has passed through the resistance of the food product and extends out the opposite end thereof, as shown in FIG. 7.

Parallel knife assembly 27 is sized to receive food product 25 thereon between walls 63 of bed 65. As such, walls 63 define a longitudinal channel 64 which extends outwardly from ends of food product 25, as best seen in FIG. 4. Blades 35 are secured to attachment surfaces 67 of sleds 69. Sleds 69 are constructed to slide in the longitudinal channel 64 of bed 65. More particularly, two sleds 69 are positioned to oppose the opposite ends of food product 25, with blades 35 facing toward such ends. The sled is positioned or constructed so that blades 35 are at a height to place them in a position to enter food product 25 at a medial location therein, preferably at or near the center of the food product to be stuffed.

What is claimed is:

1. A device for introducing a continuous length of foodstuffing into an elongated food product, over a corresponding length of the food product, the device comprising:

a tube having opposite, open ends and an inner wall defining a longitudinal passage extending between the opposite ends for receiving the length of the foodstuffing therein the tube having a length selected to correspond to the food product;

a slot extending longitudinally between the ends of the tube and in communication with the passage;

a cap having a projecting surface for guiding the tube through the food product, the cap being formed of material sufficiently hard to penetrate the food product;

means for removably attaching the cap to the tube;

a ram sized to be slidably received in the passage of the tube, the ram having an outer wall adjacent to and opposing the inner wall of the tube;

a bed adapted to receive the food product thereon, the bed having walls facing opposite sides of the food product when placed thereon, the bed defining a longitudinal channel communicating with at least one of the opposite ends of the food product placed in the bed, wherein the channel extends from both ends of the food product when placed in the bed;

at least one sled for sliding in the longitudinal channel toward one of the ends of the food product, the sled having an upper attachment surface; and a blade secured to the attachment surface and extending longitudinal toward the food product when the sled and the food product are in the bed, the attachment surface of the sled positioned above the channel at a height to place the blade in a position to enter the end of the food product at a medial location therein, wherein the device comprises a pair of the sleds, each sled oriented to direct the respective blade toward a corresponding one of the ends of the food product.

2. The device of claim 1, wherein the cap comprises a cone.

3. The device of claim 2, wherein the projecting surface of the cone has ridges formed therein to assist in removing the cone.

4. The device of claim 1, wherein the means for removably securing the cap comprises an annular flange extending from the base of the cap and having a reduced diameter to form a shoulder between the base and the flange.

5. The device of claim 1, wherein the slot is defined by opposing edges which are substantially parallel to each other, and wherein the ram includes a radially projecting handle sized to be slidably received in the slot.

6. The device of claim 1, wherein the tube and the ram comprise elongated cylinders, and wherein the longitudinal passage of the tube has a diameter ranging from approximately one inch to approximately three inches to receive the continuous length of foodstuffing therein.

7. A device for stuffing meat with a length of food stuffing, the device comprising:

a cylindrical tube with a passage extending completely therethrough and opening on opposite ends of the tube, the passage sized to receive the length of foodstuffing therein;

a slot extending longitudinal between the ends of the tube and in communication with the passage;

a penetrating cone removably attached to one of the ends of the tube;

a ram sized to be slidably received in the passage of the tube, the ram having an outer wall adjacent to and opposing the inner wall of the tube;

a stop extending radially outwardly from the ram, the stop sized to be received in and slidable relative to the slot of the tube; and a bed adapted to receive the food product thereon, the bed having walls facing the opposite sides of the food product when placed thereon, the bed defining a longitudinal channel extending from the ends of the food product when said product is placed in the bed; and a pair of sleds for sliding in the longitudinal channel toward corresponding ends of the food product, the sleds having upper attachment surfaces; and a blade secured to each of the attachment surfaces of the sleds, the blades extending longitudinally toward the food product when the sleds and the food product are in the bed, the attachment surfaces of the sleds positions above the channel at a height to place the blades in position to enter the ends of the food product in respective opposite directions, and at medial locations in the ends of the food product.

8. A method of stuffing a food product with a continuous length of food stuffing, the method comprising the steps of:

inserting the continuous length of foodstuffing inside a tube with a slot defined therein, the tube having two ends with a pointed cap at one of the ends;

penetrating a selected point on the exterior of the food product with the pointed cap;

advancing the tube relative to the food product until the cap exits the food product at a location substantially opposite the selected point of penetration;

removing the cap from the end of the tube;

providing a ram with a stop extending radially outwardly;

inserting the ram into one of the ends of the tube with the stop received in the slot of the tube;

abutting the stop against the food product at the selected location of penetration;

withdrawing the tube from the food product in the direction of the ram; the stop travelling in the slot as the tube is withdrawn;

maintaining the length of foodstuffing in position within the food product by abutting the foodstuffing with the ram as the tube is withdrawn;

placing the food product on a bed with walled sides and substantially open ends to define a longitudinal channel for receiving the food product therein, the longitudinal channel communicating with the opposite ends of the food product placed in the bed;

providing a pair of sleds with blades extending longitudinally outwardly therefrom;

positioning the sleds in the bed at respective ends of the food product and with the blades pointed toward corresponding ends of the food product; and sliding the sleds toward the food product to penetrate the ends of the food product with the blades.

9. The method of claim 8, further comprising the step of introducing food stuffing in loose form into the tube; and sliding the ram into the tube with the stop of the ram engaging the slot of the tube; and by sufficient insertion of the ram, compacting the food stuffing into a continuous and substantially length of food stuffing is created within the tube.

\* \* \* \* \*